(12) United States Patent
Petrosky et al.

(10) Patent No.: US 10,655,191 B2
(45) Date of Patent: May 19, 2020

(54) DELIVERY DEVICE USABLE IN LASER PEENING OPERATION, AND ASSOCIATED METHOD

(71) Applicant: Westinghouse Electric Company LLC, Cranberry Township, PA (US)

(72) Inventors: Lyman J. Petrosky, Latrobe, PA (US); Phillip J. Hawkins, Irwin, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 483 days.

(21) Appl. No.: 15/150,672

(22) Filed: May 10, 2016

(65) Prior Publication Data
US 2016/0333433 A1  Nov. 17, 2016

Related U.S. Application Data

(60) Provisional application No. 62/159,399, filed on May 11, 2015.

(51) Int. Cl.
*B23K 26/14* (2014.01)
*B23K 26/12* (2014.01)
(Continued)

(52) U.S. Cl.
CPC .............. *C21D 1/09* (2013.01); *B23K 26/146* (2015.10); *B23K 26/356* (2015.10)

(58) Field of Classification Search
CPC .. B23K 26/12–122; B23K 26/14–1494; B23K 26/16; A61C 1/0046
(Continued)

(56) References Cited

U.S. PATENT DOCUMENTS 5,565,120 A * 10/1996 La Rocca ............ B23K 26/123
219/121.67
5,790,620 A   8/1998 Okanaki et al.
(Continued)

FOREIGN PATENT DOCUMENTS

CN   104368911 A    2/2015
EP    0515983   *  5/1992
(Continued)

OTHER PUBLICATIONS

English translation of EP 0515983 to Richerzhagen, Bernold, published May 1992.*
(Continued)

*Primary Examiner* — Michael A Laflame, Jr.
(74) *Attorney, Agent, or Firm* — K&L Gates LLP

(57) ABSTRACT

A delivery device that is usable in a laser peening operation emits a columnar flow of a fluid that contains therein a beam of electromagnetic energy. The beam is retained within the interior of the flow of fluid since the total internal reflectivity of the flow is sufficient to do so. The flow of fluid that serves as a conduit for the beam also itself impinges on a workpiece and thus contains and washes away the plasma that forms from a laser peening operation, and this resists the plasma from reaching and possibly damaging the delivery device. The carrying of the beam in the columnar flow of fluid avoids the need to maintain a fixed distance between the delivery device and the workpiece, which simplifies the movement by a robotic manipulator of the delivery device along a non-planar surface of a workpiece during a laser peening operation.

18 Claims, 3 Drawing Sheets

(51) Int. Cl.
*C21D 1/09* (2006.01)
*B23K 26/356* (2014.01)
*B23K 26/146* (2014.01)

(58) Field of Classification Search
USPC .......................................... 219/121.6–121.86
See application file for complete search history.

(56) References Cited

U.S. PATENT DOCUMENTS

| | | | |
|---|---|---|---|
| 6,084,202 | A | 7/2000 | Okazaki et al. |
| 6,163,012 | A | 12/2000 | Kimura et al. |
| 6,539,035 | B1 | 3/2003 | Yoda et al. |
| 6,881,925 | B1 | 4/2005 | Sato et al. |
| 7,163,875 | B2 | 1/2007 | Richerzhagen |
| 7,728,258 | B2 | 6/2010 | Richerzhagan et al. |
| 8,304,686 | B2 | 11/2012 | Sano et al. |
| 8,330,070 | B2 | 12/2012 | Sano et al. |
| 8,331,522 | B2 | 12/2012 | Ono et al. |
| 8,993,923 | B2 | 3/2015 | Hu et al. |
| 2005/0092722 | A1 | 5/2005 | Dane et al. |
| 2006/0133752 | A1 | 6/2006 | Zhang |
| 2007/0193990 | A1 | 8/2007 | Richerzhagan et al. |
| 2007/0278195 | A1 | 12/2007 | Richerzhagen et al. |
| 2008/0105666 | A1 | 5/2008 | Adachi et al. |
| 2008/0257976 | A1* | 10/2008 | Danzer .................. B23K 9/291 239/13 |
| 2011/0240615 | A1 | 10/2011 | Suruceanu et al. |
| 2013/0015168 | A1* | 1/2013 | Nagahori ............... B23K 26/14 219/121.72 |
| 2013/0206739 | A1* | 8/2013 | Reed ....................... F01D 25/12 219/121.71 |

FOREIGN PATENT DOCUMENTS

| | | |
|---|---|---|
| EP | 3213858 A1 | 9/2017 |
| WO | 2014/170868 A1 | 10/2014 |

OTHER PUBLICATIONS

International Search Report and Written Opinion of the International Searching Authority dated Aug. 19, 2016 for PCT/US2016/031592 (Forms PCT/ISA/220, PCT/ISA/210, PCT/ISA/237).
Westinghouse Electric Company LLC, European Application No. 16793356.3 Search Report, dated Dec. 13, 2018, 6 pages.

* cited by examiner

DELIVERY DEVICE USABLE IN LASER PEENING OPERATION, AND ASSOCIATED METHOD

CROSS-REFERENCE TO RELATED APPLICATION

The instant application claims priority from U.S. Provisional Patent Application Ser. No. 62/159,399 filed May 11, 2015, the disclosures of which are incorporated herein by reference.

BACKGROUND OF THE INVENTION

Field

The disclosed and claimed concept relates generally to a laser peening operation and, more particularly, to a method of delivering a beam of electromagnetic energy such as a laser beam onto a workpiece.

Related Art

Laser peening is well understood in the relevant art and is usable to introduce compressive surface stresses into a workpiece. The typical laser peening operation involves impinging a pulsed high energy laser beam on a workpiece. The workpiece typically must have an ablative layer situated on it. However, it is also possible to perform laser peening without an ablative layer by ablating the surface of the workpiece itself under a covering of water, sometimes referred to as a water blanket, with the water being employed to retain by inertial confinement a plasma pressure shock that is created from the laser impinging on the workpiece. The laser and the related equipment must be spaced a predetermined distance away from the workpiece, typically several centimeters or more, because the laser peening operation results in the aforementioned plasma pressure shock wave. The shock wave emanates from the location on the workpiece where the laser peening operation is being performed, and it is thus desirable to avoid damage to the equipment from the shock wave, both by providing the water blanket and by spacing the equipment from the workpiece.

While such laser peening equipment and methods have been generally effective for their intended purposes, they have not been without limitation. To be effective, the laser must be focused onto a small area on the workpiece, and maintaining such a focus makes the design and motion of the robotic laser manipulation and delivery system very complex when applied to non-planar surfaces of the workpiece. The amount of water that typically is required in a laser peening operation is significant because the water delivery mechanism typically coats a large region of the workpiece in a water blanket. Such water must be collected and drained or otherwise removed from the work site, which can be tedious and costly. Alternatively, the laser peening operation can take place with the workpiece being submerged in water, which includes its own complications and expense. Improvements would therefore be desirable.

SUMMARY

Accordingly, an improved delivery device that is usable in a laser peening operation emits a columnar flow of a fluid that contains therein a beam of electromagnetic energy. The beam is retained within the interior of the flow of fluid since the total internal reflectivity of the flow is sufficient to do so. The flow of fluid thus effectively functions in the same fashion as fiber optic cable in that it contains therein the beam of electromagnetic energy based upon its having a sufficiently high total internal reflectivity. The flow of fluid that serves as a conduit for the beam also itself impinges on the workpiece and thus blankets the plasma and washes away the debris that forms from a laser peening operation. Additional water to form a water blanket on the workpiece is thus unnecessary and makes an improved method of using the delivery device practical for a laser peening operation and for other applications.

Accordingly, an aspect of the disclosed and claimed concept is to provide an improved delivery device that outputs a columnar flow of fluid that has a beam of electromagnetic energy contained therein based upon the total internal reflectivity of the flow.

Another aspect of the disclosed and claimed concept is to provide an improved method of performing a laser peening operation by using such a delivery device.

Another aspect of the disclosed and claimed concept is to provide an improved delivery device and method of use that enable a laser peening operation to be performed on a workpiece without additionally needing a water blanket on the workpiece.

Another aspect of the disclosed and claimed concept is to provide an improved delivery device that outputs a flow of a fluid that impinges on a workpiece during a laser peening operation and that delivers a laser beam onto a small spot on the workpiece over a wide range of distances from the delivery device.

Accordingly, an aspect of the disclosed and claimed concept is to provide an improved delivery device, the general nature of which can be stated as including a housing having a hollow cavity formed therein, an inlet in fluid communication with the cavity and structured to deliver a stream of a fluid to the cavity, an outlet in fluid communication with the cavity and structured to deliver a flow of the fluid out of the cavity, and a delivery mechanism structured to deliver a beam of electromagnetic energy out of the outlet and within the flow.

Another aspect of the disclosed and claimed concept is to provide an improved method of employing the aforementioned delivery device. The method can be generally stated as including forming within a medium having a first index of refraction a flow of a fluid having a second index of refraction, the second index of refraction being greater than the first index of refraction, receiving a beam of electromagnetic energy within the interior of the flow, and maintaining a total internal reflectivity inside the flow sufficient to retain the beam within the interior of the flow.

Optionally, the method can also include impinging the flow and the beam onto a workpiece. Optionally, the method can additionally include performing a laser peening operation on the workpiece. Optionally, the method can further include employing the flow to contain a plasma that is created from the laser peening operation and to resist the plasma from expanding and traveling in a direction generally toward the delivery device.

BRIEF DESCRIPTION OF THE DRAWINGS

A further understanding of the disclosed and claimed concept can be gained from the following Description when read in conjunction with the accompanying drawings in which:

Similar numerals refer to similar parts throughout the Specification.

DESCRIPTION

Figure 1:
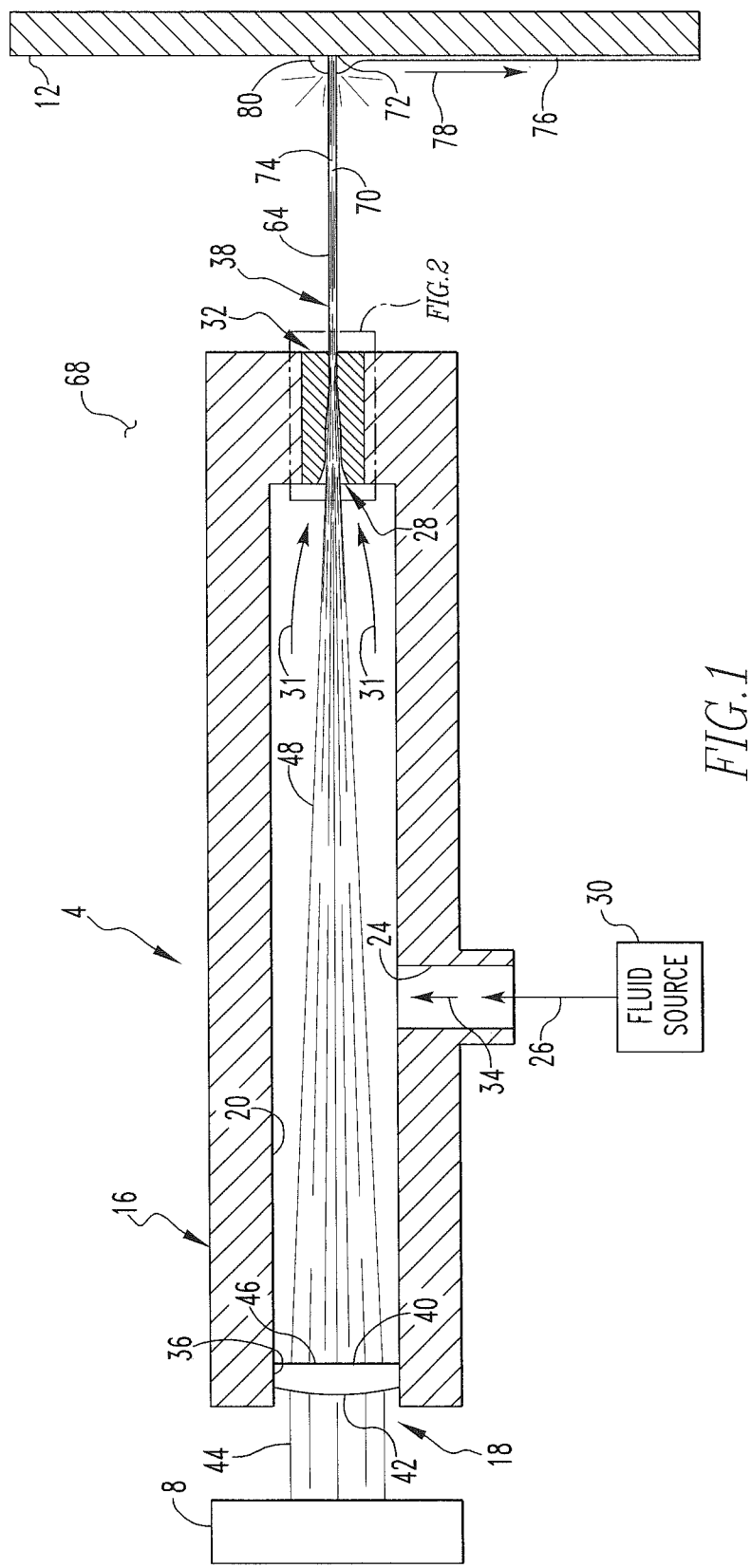
FIG. 1 is a side view, partially cut away, of an improved delivery device in accordance with the disclosed and claimed concept.
Figure 2:
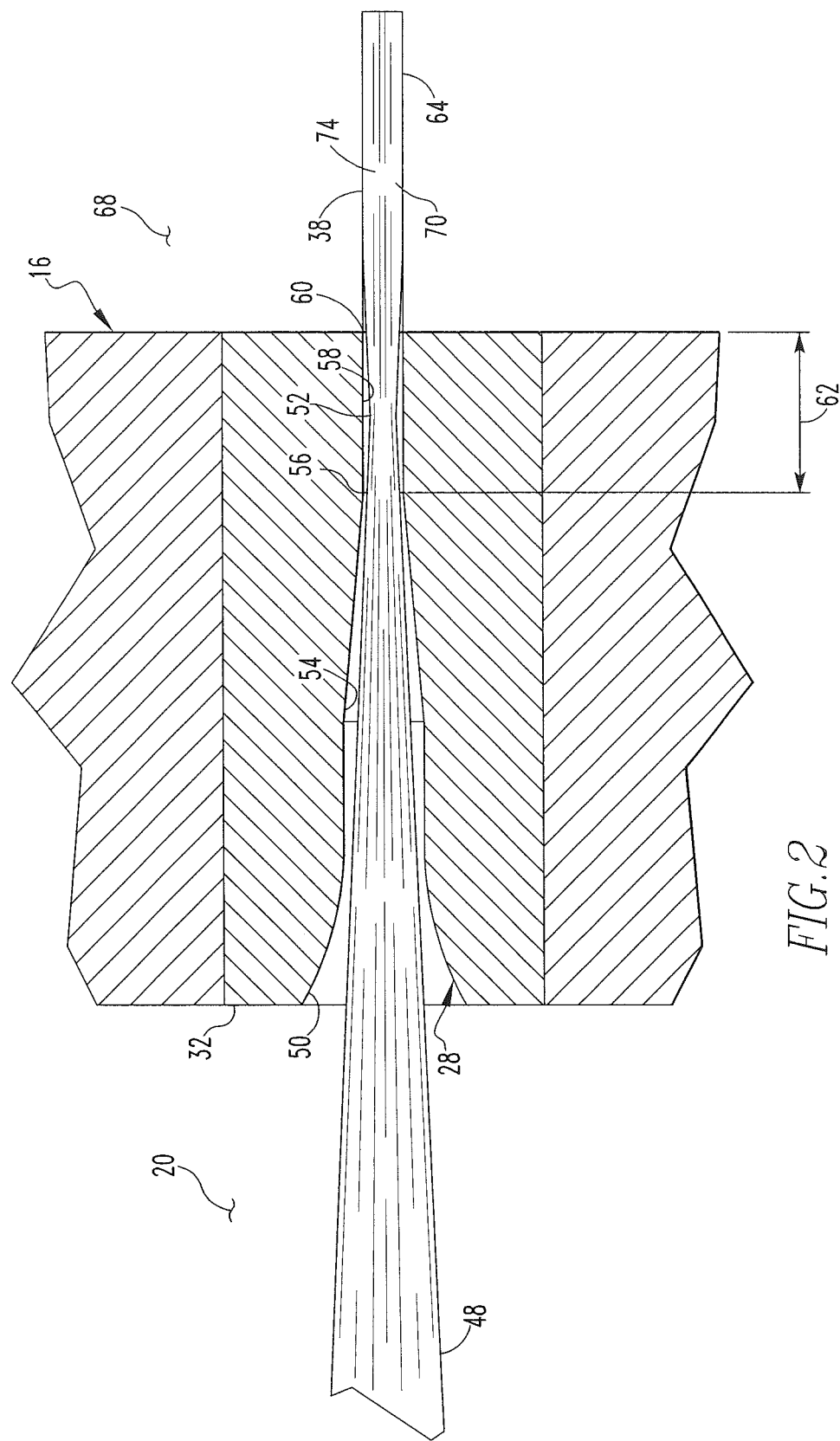
FIG. 2 is an enlarged view of the indicated portion of FIG. 1.

An improved delivery device 4 in accordance with the disclosed and claimed concept is depicted in FIGS. 1 and 2 in a partially cut away fashion. The delivery device 4 is usable with a laser 8 which serves as an emitter of electromagnetic energy in order to perform an operation, such as a laser peening operation that is performed on a workpiece 12. While the delivery device 4 is described herein in terms of its exemplary possible use in the performance of a laser peening operation, it is understood that the ideas contained herein can be used in fashions other than in connection with a laser peening operation, and it is therefore understood that the laser peening operation that is described herein is exemplary only and is not intended to be limiting.

The delivery device 4 can be said to include a housing 16 and a delivery mechanism 18. The housing 16 is formed from an appropriate material such as a metal or a polymer or other material and has a hollow cavity 20 formed therein. The housing 16 additionally has an inlet 24 and an outlet 28 that are both in fluid communication with the cavity 20. The inlet 24 is in fluid communication with a fluid source 30 which, in the depicted exemplary embodiment, is a source of a fluid in the form of reasonably purified liquid water, meaning water that has been filtered and/or otherwise treated, but it is not necessarily intended to refer to a source of water from which all impurities have been removed. While the exemplary fluid that is described herein is liquid water, it is understood that other fluids in a liquid state can be employed without departing from the spirit of the instant disclosure.

The fluid source 30 delivers a stream 34 of the fluid through the inlet 24, as is indicated with the arrow 26, and into the cavity 20. The fluid within the cavity 20 flows, as is indicated at the arrows 31, toward the outlet 28, after which the fluid forms a flow 38 of the fluid as it exits the cavity 20 out of the outlet 28. The housing 16 further includes a nozzle 32 within which the outlet 28 is formed and that forms the flow 38.

The delivery mechanism 18 can be said to include the laser 8 and can additionally be said to include a lens 40 that is mounted in an opening 36 that is formed in the housing 16. As can be seen in FIGS. 1 and 2, the laser 8 emits a collimated laser beam 44 which impinges a first surface 42 of the lens 40. The electromagnetic energy from the collimated laser beam 44 passes through the lens 40 and out of a second surface 46 of the lens 40. The electromagnetic energy from the collimated laser beam 44 exiting the second surface 46 is caused by the lens 40 to converge through a convergence region 48 into a focal point 52 that is depicted in FIG. 2 as being situated within the outlet 28.

It is understood that the exemplary lens 40 is formed of glass or other transparent solid and is designed to have optical properties that cause the electromagnetic energy of the collimated laser beam 44 to converge at the focal point 52 based at least in part upon the index of refraction of the glass from which the lens 40 is formed and the index of refraction of the fluid from the fluid source 30. That is, the collimated laser beam 44 in the depicted exemplary embodiment is depicted in FIG. 1 as traveling through a medium 68 which in the depicted exemplary embodiment is air, and the collimated laser beam 44 thus impinges on the lens 40 at an exemplary air-to-glass interface at the first surface 42. However, at the second surface 46 the electromagnetic energy exits the lens 40 at an exemplary glass-to-water interface. It is understood that water has an exemplary index of refraction greater than that of air, and such factors are taken into account when developing the optical parameters of the lens 40.

As can be understood from FIG. 1, the fluid travels as the stream 34 through the inlet 24 and into the cavity 20, and the fluid thereafter exits the cavity 20 and travels as the flow 38 into the outlet 28 of the nozzle 32. At least a portion of the flow 38 is, in the depicted exemplary embodiment, a free columnar jet 64 of the fluid and is situated in the medium 68 which, in the depicted exemplary embodiment, is air.

As is best shown in FIG. 2, the outlet 28 can be said to include a curved entryway 50 adjacent a tapered region 54. The outlet 28 in the depicted exemplary embodiment further includes a straight section 58 of an unvarying diameter (i.e., transverse to the direction of flow) and of a length 62. The fluid enters the outlet 28 at the curved entryway 50, which provides a smooth, i.e., non-turbulent, transition from the adjacent cavity 20. The fluid thereafter flows into the tapered region 54 which amplifies the fluid velocity while retaining fluid symmetry and non-turbulence. The fluid then flows into an entrance 56 to the straight section 58 and then out of an exit 60 of the straight section 58, at which time the flow 38 forms the free jet 64. The length 62 of the straight section 58 provides the final collimation for the fluid stream.

To avoid loss of energy and coherence of the electromagnetic energy that is output from the laser 8, the laser 8 is focused to avoid impinging on the nozzle 32 within the outlet 28. This is accomplished, in the depicted exemplary embodiment, by setting the focal point 52 of the electromagnetic energy from the laser 8 at a location approximately midway along length of the straight section 58. The electromagnetic laser energy converges at the focal point 52 and then symmetrically diverges after the focal point 52, which is to the right of the focal point 52 in FIG. 2. When the laser energy travels out of the exit 60 the outlet 28, the diameter of the converged beam 70 is still less than the fluid stream diameter. The total internal reflection of the flow 38 of the fluid retains the laser energy within the flow 38 of the fluid after the flow 38 travels out of the exit 60 the outlet 28.

While in the depicted exemplary embodiment the focal point 52 is situated near the center of the straight section 58 of outlet 28, this is intended to be merely one illustration of how the advantageous results described herein can be obtained and is not intended to be limiting. Alternatively, the outlet 28 could be configured in any of a variety of other fashions, and the focal point could be located at any of a variety of locations within the flow 38 without departing from the spirit of the instant disclosure. For instance, the focal point 52 could be spaced slightly before the entrance 56 the straight section 58, or it could be situated anywhere along the length of the straight section 58, or the focal point 52 potentially could be somewhere along the free jet 64 and after the exit 60, without departing from the present concept.

The collimated laser beam 44 may have a diameter, i.e., width, of ⅜ inch, by way of example. The lens 40 converges the collimated laser beam 44 through the convergence region 48 until at the focal point 52 the electromagnetic energy from the laser 8 has a diameter, i.e., width, of approximately ⅟₃₂ inch, which is approximately 0.8 millimeters. The exemplary nozzle 32 in the straight section 58 has an internal diameter of approximately 1.0 millimeters. Alternatively, by way of example, the electromagnetic energy could have a diameter 0.5 millimeters at the focal point 52 and the nozzle 32 in the straight section 58 could have a diameter of 0.8 millimeters. Other dimensions can be employed.

In the absence of the flow 38 of the fluid, such as if the delivery device 4 were instead situated in a vacuum, the electromagnetic energy from the laser 8 at a location beyond the focal point 52, i.e., at a location to the right of the focal point 52 from the perspective of FIG. 1, would tend to diverge into a beam of expanding diameter. Advantageously, however, the provision of the flow 38 of the fluid causes the electromagnetic energy from the laser 8 to instead form a converged beam 70 downstream, i.e., to the right from the perspective of FIG. 1, of the focal point 52. The electromagnetic energy enters the flow 38 roughly parallel with columnar axis of the free jet 64 to maintain a low angle of incidence with surface and thereby enable the internal reflectivity of the flow 38 to retain the converged beam 70 within the interior 74 of the free jet 64. The converged beam 70 constitutes substantially all of the electromagnetic energy that was emitted by the laser 8 in the collimated laser beam 44. The flow 38 forms the electromagnetic energy that travels from the focal point 52 into the converged beam 70 inasmuch as the flow 38 has a total internal reflectivity that is sufficiently high that the converged beam 70 is retained within an interior 74 of the flow 38.

Such total internal reflectivity is maintained by forming the flow 38 as a columnar flow. As is understood in the relevant art, a fluid stream exhibits Plateau-Rayleigh instability due to fluid surface tension, resulting in fluid thread breakup. This instability places on upper limit on the distance that the free jet 64 can travel from the nozzle 32 while continuing to retain the converged beam 70 within its interior 74. With increased distance from the nozzle 32, surface undulations on the jet 64 eventually become significant enough in size and quantity to cause a reduction in internal reflectivity. It is understood that jet 64 will exhibit what is likely its greatest usable length when the nozzle 32 is designed to maximize the initial uniformity of the flow 38 into jet 64. A variety of nozzle designs, flow velocities, and distances between the nozzle 32 and the workpiece 12 can be employed so long as the jet 64 remains sufficiently columnar such that its total internal reflectivity remains sufficiently high to retain enough of the energy of the converged beam 70 within the interior 74 of the flow 38 that, for instance, the laser peening operation is successful.

It thus can be understood that the flow 38 of the fluid functions in much the same way as a fiber optic cable, and the converged beam 70 will be retained within the interior 74 of the flow 38 despite the deflection of the free jet 64 as a result of gravity acting thereon so long as the diameter of the free jet 64 remains substantially unvarying and the flow 38 remains substantially columnar Typically such a columnar flow will be laminar, but this need not necessarily be the case.

As noted, the total internal reflectivity of the free jet 64 is sufficiently high that it retains the converged beam 70 within the interior 74 of the free jet 64, and this is at least in part because the index of refraction of the fluid is greater than the index of refraction of the medium 68. Furthermore, such retention of the converged beam is achieved in part because the converged beam 70 has an angle of incidence at an internal boundary between the free jet 64 and the medium 68 that is sufficiently shallow that the converged beam 70 is reflected back into the interior 74 rather than exiting the free jet 64. Again, the converged beam 70 is retained within the interior 74 as long as the free jet 64 remains sufficiently columnar. While the exemplary fluid described herein is water, and while the exemplary medium 68 described herein is air, it is understood that other materials can be employed depending upon the particular needs of the given application without departing from the spirit of the present disclosure.

As can further be seen in FIG. 1, the free jet 64 impinges on the workpiece 12 at a location of impingement 72 thereon. In the depicted exemplary embodiment, the impingement of the converged beam 70 on the workpiece 12 at the location of impingement 72 performs a laser peening operation on the workpiece 12 at the location of impingement 72. Advantageously, the impingement of the free jet 64 itself on the workpiece 12 at the location of impingement 72 is employed as an inertial blanket for the plasma that is generated by the laser peening operation at the location of impingement 72. That is, the fluid of the free jet 64 impinging on the workpiece 12 provides a fluid cover at the location of impingement 72 that retains the plasma by resisting it from expanding and traveling away from the workpiece 12 in a direction generally toward the delivery device 4. After impingement of the free jet 64 on the workpiece 12 at the location of impingement 72, the free jet 64 fans out, as at the numeral 80, on the surface of the workpiece 12 and then form drips as a trickle 78 of fluid that flows vertically downward on the workpiece 12 due to gravity, as is indicated at the arrow 78. The free jet 64 at the location of impingement 72 contains at the surface of the workpiece 12 the plasma and the debris that is produced from the laser peening operation at the location of impingement 72, and thus the jet 64 quickly washes away in the trickle 76 of the fluid the plasma bubble and the debris that result from the laser peening operation. This is advantageous because the rapid cleansing of the location of impingement 72 allows for a high repetition rate for the laser peening shots and improved processing speed. In addition, containment and disposal of the relatively small trickle 76 is far easier than containing and disposing of a water blanket that covers a relatively much larger area on the workpiece 12. This results in costs savings and simplicity of operation. It thus can be seen that the flow 38 of the fluid serves as 1) an optical conduit, 2) an internal cover that contains the plasma that is formed at the location of impingement 72, and 3) a method to wash away the plasma bubble and debris.

Upon impinging on the workpiece 12 at the location of impingement 72, the converged beam 70 that is situated within the interior 74 of the free jet 64 delivers electromagnetic energy to an area approximately equal to or only marginally larger than the incident free jet 64. Since the diameter of the free jet 64 does not vary substantially between the exit 60 and the workpiece 12 (which is typically a distance of several centimeters), the size of the converged beam 70 incident on the workpiece 12 at the location of impingement 72 remains of substantially the same size and is nearly constant regardless of whether the distance is two centimeters, three centimeters, or four centimeters, by way of example. As such, the distance between the exit 60 and the workpiece 12 at the location of impingement 72 can vary generally so long as the free jet 64 remains substantially columnar.

The aforementioned possible variability in the distances between the delivery device 4 and the workpiece 12 while performing a laser peening operation demonstrate that the present concept provides great flexibility in peening nonplanar surfaces in conjunction with the use of a simplified robotic nozzle positioning system upon which the delivery device 4 is situated. With previous laser peening systems the distance between the laser and the workpiece was required to be kept very precise in order to maintain a precise focus of the laser on the workpiece. The delivery device 4 advantageously avoids the need to maintain a precise distance between the delivery device 4 and the workpiece 12 since the focusing of the laser 8 is achieved inside the flow 38, and the flow 38 retains the converged beam 70 therein and impinges the converged beam 70 on the workpiece wherever the free jet 64 impinges. In addition, the free jet 64 dissipates the shock waves that emanate from the location of impingement 72 and thereby minimizes the potential for damaging the delivery device 4.

It thus can be seen that the free jet 64 functions both as an optical conduit for the converged beam 70 as well as a source of water that is sufficient to cover the location of impingement 72 and to trap the plasma at such location in order to avoid damage to the delivery device 4. The free jet 64 is configured to have a sufficiently low velocity to maintain a columnar shape with a typically laminar flow characteristic, and the trickle 76 that results from the impingement of the free jet 64 at the location of impingement 72 is a relatively small volumetric flow which is far smaller in flow rate than a water blanket such as previously had been required with prior laser peening operations. Other advantages will be apparent.

Figure 3:
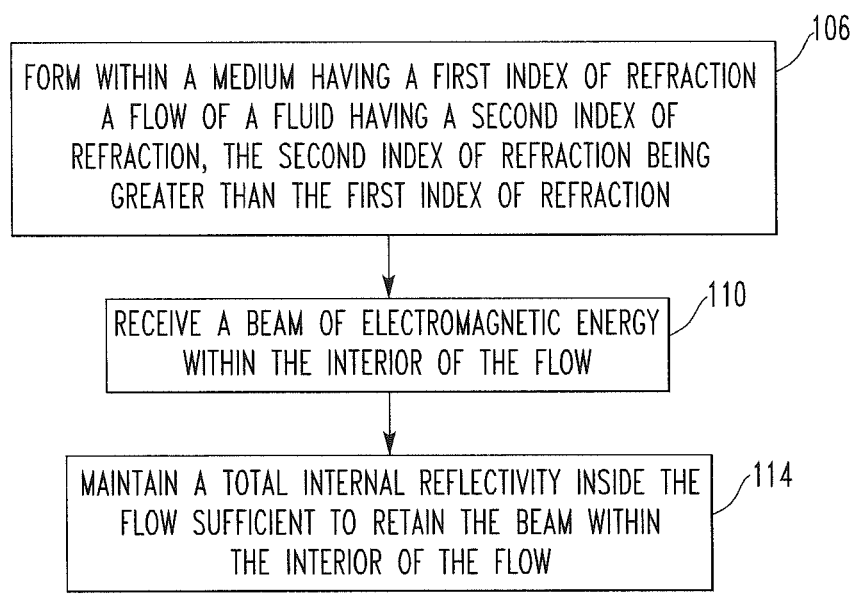
FIG. 3 is a flowchart depicting certain aspects of an improved method in accordance with the disclosed and claimed concept.

An improved method in accordance with the disclosed and claimed concept is depicted in FIG. 3. The method can begin, as at 106, where the delivery device 4 forms within the medium 68 the flow 38 in the form of a free jet 64. The fluid that forms the free jet 64 has an index of refraction greater than that of the medium 68 within which the free jet 64 is formed. The method can then continue, as at 110, where a beam of electromagnetic energy, such as the collimated laser beam 44, is received within the interior 74 of the flow 38. The method also includes, as at 114, maintaining a total internal reflectivity within the interior 74 of the flow 38 sufficient to retain the converged beam 70 within the interior 74 of the flow 38.

The method can include performing a laser peening operation at the location of impingement 72, although other uses potentially can be made of the converged beam 70 that is situated within the interior 74 of the flow 38. It is therefore reiterated that the performance of a laser peening operation using the delivery device 4 is not intended to be limiting. It is also noted that the exemplary laser 8 outputs the collimated laser beam 44 having a diameter much greater than that of the free jet 64, and that the lens 40 is therefore provided in order to intensify the collimated laser beam 44 by concentrating its energy within the relatively smaller converged beam 70. It is understood, however, that other embodiments of the delivery device potentially could employ a different delivery mechanism having a laser that outputs a collimated output that is already slightly less than the diameter of the free jet 64, thereby obviating the need for the lens 40 in such an application.

Furthermore, it is noted that the laser 8 typically will be physically mounted to the delivery device 4, although this need not necessarily be the case. While the collimated laser beam 44 is depicted in FIG. 1 as being oriented parallel with the central axis of the nozzle 32, it is understood that in alternative embodiments the laser 8 can be otherwise positioned and can rely upon mirrors and/or fiber optic devices to direct a beam of electromagnetic energy from such laser into the flow 38. It thus is understood that the exemplary delivery mechanism 18 that is depicted in FIG. 1 is not intended to be limiting in any fashion, and it is understood that any set of components can be provided to deliver a beam of electromagnetic energy into the interior 74 of the flow 38, after which the total internal reflectivity of the flow 38 will retain the beam of electromagnetic energy within the interior 74.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the foregoing disclosure.

What is claimed is:

1. A delivery device comprising:
   a housing having a hollow cavity formed therein;
   an inlet in fluid communication with the cavity and structured to deliver a stream of a fluid to the cavity;
   an outlet in fluid communication with the cavity and structured to deliver a flow of the fluid out of the cavity, the outlet comprising a straight section and further comprising at least one of a curved entryway and a tapered region situated upstream of the straight section; and
   a delivery mechanism structured to deliver a beam of electromagnetic energy out of the outlet and within the flow, the delivery mechanism comprising a lens and a laser, the lens being structured to receive the beam from the laser and to direct the beam to a focal point.

2. The delivery device of claim 1 wherein the outlet is structured to deliver as the flow a columnar flow of the fluid out of the outlet.

3. The delivery device of claim 2 wherein the outlet is structured to deliver as the columnar flow a columnar jet of the fluid out of the outlet.

4. The delivery device of claim 3 wherein the outlet is structured to deliver as the columnar jet a laminar free jet having a total internal reflectivity sufficient to retain the beam within the interior of the free jet.

5. The delivery device of claim 1 wherein the focal point is situated one of adjacent and within the outlet.

6. A method of employing the delivery device of claim 1, comprising:
   forming within a medium having a first index of refraction a flow of a fluid having a second index of refraction, the second index of refraction being greater than the first index of refraction;
   receiving a beam of electromagnetic energy within the interior of the flow; and
   maintaining a total internal reflectivity inside the flow sufficient to retain the beam within the interior of the flow.

7. The method of claim 6, further comprising forming as the flow a columnar flow.

8. The method of claim 7, further comprising forming as the columnar flow a laminar flow.

9. The method of claim 8, further comprising forming as the columnar flow a free jet within the medium.

10. The method of claim 6, further comprising impinging the flow and the beam on a workpiece.

11. The method of claim 10, further comprising performing a laser peening operation on the workpiece, the performing of the laser peening operation comprising the impinging of the flow and the beam on the workpiece.

12. The method of claim 11, further comprising employing the flow to resist the expansion of a plasma from the workpiece in a direction generally toward the delivery device.

13. The method of claim 11, further comprising spacing the delivery device at least a first predetermined distance from the workpiece to avoid damage to the delivery device from a shock wave that results from the laser peening operation and that travels from the workpiece in a direction generally toward the delivery device.

14. The method of claim 11, further comprising employing water as the fluid.

15. The delivery device of claim 1 wherein the straight section has a substantially unvarying diameter.

16. The delivery device of claim 1 wherein the outlet comprises both of the curved entryway and the tapered region.

17. The delivery device of claim 16 wherein the curved entryway is situated upstream of the tapered region.

18. The delivery device of claim 4 wherein the focal point is situated within the interior of the free jet.

\* \* \* \* \*